July 2, 1963  A. W. HAYDON  3,096,452
MOTOR FOR ELECTRIC CLOCKS
Filed March 17, 1958
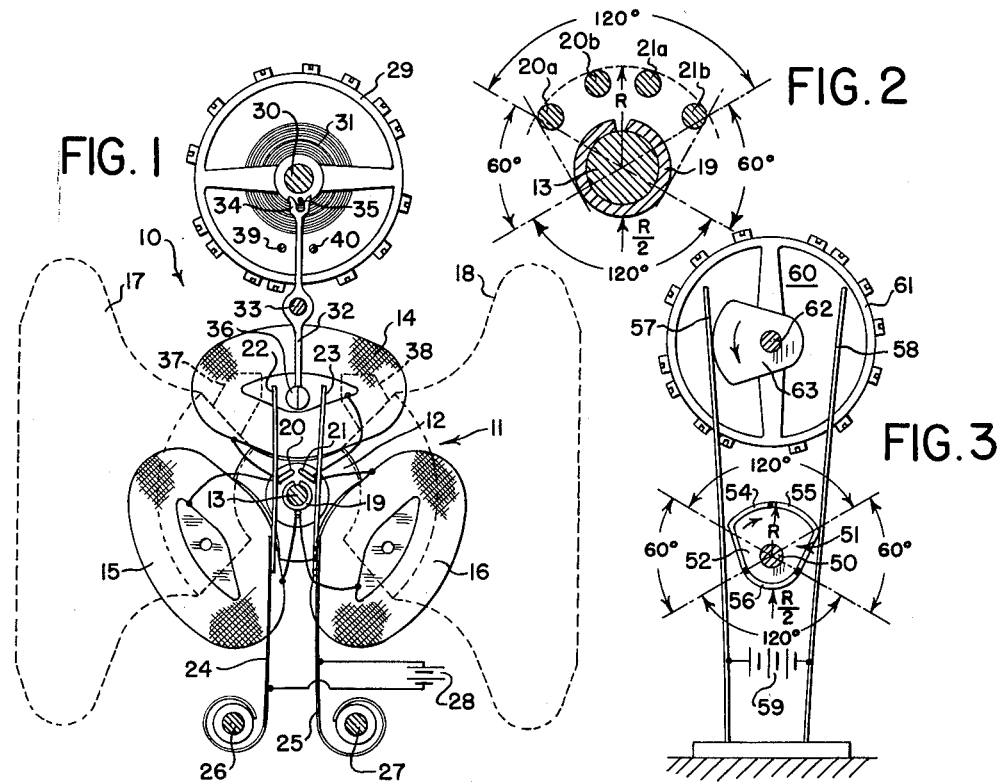
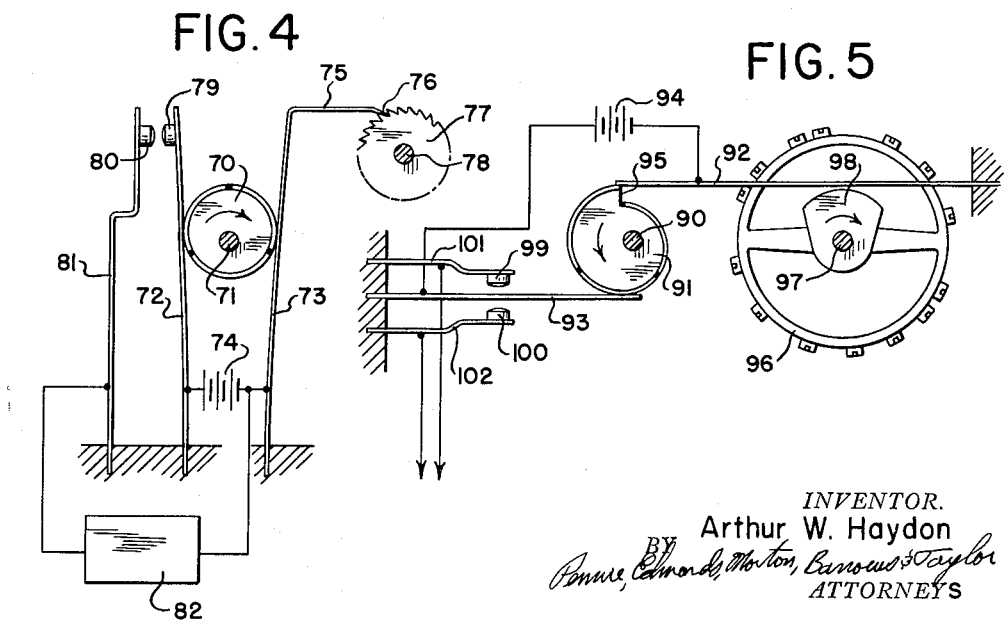
INVENTOR.
Arthur W. Haydon
ATTORNEYS United States Patent Office 3,096,452
Patented July 2, 1963

3,096,452
MOTOR FOR ELECTRIC CLOCKS
Arthur W. Haydon, Milford, Conn., assignor to Consolidated Electronics Industries Corp., Waterbury, Conn., a corporation of Delaware
Filed Mar. 17, 1958, Ser. No. 721,795
19 Claims. (Cl. 310—46)

The present invention relates to electric motors, and is concerned more particularly with improvements in electric motors having commutators, to the end that a commutator and brush means, conventionally employed to supply electric current to a motor rotor, may function in additional capacities, as in governing, timing, counting, operating external controls, etc. The invention is particularly applicable to small, low current electric motor combinations, but is not necessarily limited thereto.

In electric motors having wound rotors, electric current is supplied to the rotor coils by brushes which bear against a commutator carried by the rotor shaft. The commutator is divided into a plurality of segments, and, as the various segments come into contact with the brushes, current is directed through some or all of the rotor coils in a desired manner. Frequently, the motor may have associated therewith means for governing its speed, counting its rotations, effecting the cyclical actuation or operation of other apparatus or systems, etc. And, conventionally, such additional functions are carried out by appropriate mechanisms driven by the motor shaft. In accordance with the invention, such an apparatus may be greatly simplified and improved by providing a commutator which is eccentric or non-circular with respect to the rotor shaft and which coacts with resiliently mounted brushes capable of following the outline of the eccentric commutator throughout rotations thereof. In the improved arrangement, cyclical motion is imparted to the brushes, as the rotor rotates, and such cyclical movement may be directed to the performance of functions such as governing, timing, counting and the like.

One of the most important and advantageous applications of the invention is in motor-governor combinations of the general type described and claimed in my earlier patents, No. 2,523,298, issued September 26, 1950, for "Motor Speed Governor" and Re. 24,310, issued April 30, 1957, for "Motor Speed Governor." In general, the patented devices utilize a motor, arranged to be driven at a speed somewhat above a desired, predetermined speed, and the power circuit to the motor includes a pair of contacts, which are opened cyclically, at instants determined by the travel of the motor. A constant speed device, such as a balance wheel mechanism, is also associated with the contacts, and permits or causes the contacts to be closed cyclically at instants determined solely by the operation of the constant speed device.

Heretofore, the patented motor-governor combinations have incorporated motors using commutators of more or less conventional design, and governing of the motor has been carried out by means of contacts opened by a motor driven cam. And, while such an arrangement is satisfactory for many purposes, where the motor must operate on an extremely low current draw, such as 200 microwatts at about 1.5 volts, the use of commutator contacts in addition to timing or governing contacts, introduced undesirable electrical and mechanical inefficiencies. In addition, the presently known arrangements require more parts, are more costly and are of greater physical bulk than is desired for some purposes.

In accordance with the invention, an improved motor-governor combination is provided, in which the commutator is eccentric or non-circular with respect to the shaft of the rotor, and the brushes coacting with the commutator are mounted for resilient movement permitting the brushes to remain in contact with the commutator throughout rotations thereof. When power is supplied to the brushes, causing the rotor and commutator to rotate, the brushes move cyclically from side to side, as determined by the outline of the eccentric commutator. Accordingly, a constant speed device, such as a balance wheel mechanism, may be arranged to act cyclically upon the brushes in accordance with the general scheme set forth in my earlier patents, so that, during each revolution of the rotor, when the rotor is rotating near a predetermined speed, contact between one of the brushes and the commutator will be broken at an instant determined by the travel of the motor and later established at an instant determined by the constant speed device. The apparatus of the invention represents a substantial improvement over and simplification of my patented arrangements, at least as respects certain contemplated uses of the improved apparatus, in that governing of the motor may be effected by direct action upon the brushes, rather than by means of separate contacts. Thus, one of the most important contemplated uses of the improved mechanism is in the operation of so-called cordless (i.e. battery driven) clocks, which are arranged to be driven by means such as a standard 1.65 volt dry cell battery. A particularly advantageous form of cordless clock drive is more comprehensively illustrated and described in the copending application of Arthur W. Haydon et al., Ser. No. 721,706, filed March 17, 1958, now Patent No. 3,058,017, for "Motor Speed Governor Unit for Cordless Clocks and the Like," owned by the assignee of this application.

The device of the invention may also be incorporated to advantage in various other combination mechanisms, certain of which will be described specifically herein. Accordingly, for a better understanding of the invention, reference should be made to the following detailed description and to the accompanying drawings, in which:

FIG. 1 is a simplified representation of a motor-governor combination incorporating the improved arrangements of the invention;

FIG. 2 is an enlarged representation of the commutator incorporated in the device of FIG. 1;

FIG. 3 is a simplified representation of a modified form of motor-governor combination incorporating the invention; and FIGS. 4 and 5 are simplified representations of other typical combination mechanisms incorporating the invention.

The form of the invention shown in FIG. 1, further details of which are described in the beforementioned copending application of Arthur W. Haydon et al., comprises an electric motor 10 having a wound rotor 11 and suitable permanent or electromagnetic means forming a stator. The illustrated rotor 11 comprises a hub 12 mounted on a shaft 13 and supporting a plurality of coils 14—16, the shaft 13 being journalled in any conventional manner for rotation about a fixed axis. The illustrated motor arrangement is especially adapted to incorporate permanent magnet means as a stator, and suitable magnets for this purpose are illustrated at 17, 18.

In accordance with known principles of motor operation, electric current is supplied to the coils 14—16 in a manner such that coils within the effective fields of the stator magnets 17, 18 are energized by current flowing in a direction tending to produce torque in a predetermined direction. To this end, it is well known to provide a commutator, which is mounted on the rotor shaft and cooperates with brushes supplying current from a source to direct the flow of current in a proper direction and through proper coils during the progressive rotation of the rotor.

In conventional motor construction, the commutator, is a member of circular cross section, which has its center coincident with the axis of the rotor shaft and which is divided into a plurality of commutator segments, the number of the segments usually being equal to the number of coils. Thus, in a motor such as illustrated in FIG. 1, the commutator would be provided with three segments and each coil would be connected to two adjacent segments, the relative orientation of the rotor coils, commutator segments, brushes and stator magnets being such that, as the rotor rotates, current is supplied to different pairs of commutator segments to direct the flow of current to a proper coil or coils of the rotor.

The novel and improved commutator incorporated in the device of FIG. 1 comprises a first segment 19, which is advantageously in the form of a split collar tightly received on the rotor shaft 13. Second and third commutator segments 20, 21 are advantageously in the form of U-shaped wires, the legs 20a, 20b and 21a, 21b of which extend parallel to the rotor axis and are anchored at one end in the rotor hub 12.

In accordance with the present invention, the configuration of the commutator segments 19—21 is such that the peripheral outline of the commutator is eccentric or non-circular with respect to the axis of the rotor shaft 13. Thus, in the apparatus shown in FIGS. 1 and 2, the commutator segments 20, 21 are advantageously arranged to lie substantially in a circular or cylindrical arc, which is concentric with the axis of the rotor shaft 13, but which has a radius substantially greater than that of the shaft. And, where the segments 20, 21 are, as contemplated, formed of U-shaped wire elements, the legs 20a—21b thereof are anchored at points lying on a circle concentric with the shaft axis.

Advantageously, the spacing and arrangement of the active portions of the commutator segments 20, 21 is such that the surface outline of the segments is substantially circular. That is, the distance between edges of the commutator segments is relatively short, so that the chord included between the edges does not deviate substantially from a true arc. However, it will be understood that the commutator segments may be arcuate in form, if desirable or expedient, to follow precisely the contour of a circle. The commutator segment 19, being substantially cylindrical in form, has an active outer surface area which is circular and concentric with the axis of the rotor shaft 13.

In accordance with the invention, the cylinder, concentric to the rotor shaft 13, which circumscribes the commutator segments 20, 21 is of greater diameter than the outside diameter of the commutator segment 19. Advantageously, the diameter of the circumscribing cylinder is about twice that of the commutator segment 19, and the segments 20, 21 extend over an arc of the cylinder of approximately 120°. The arrangement is such that the surface outline of the commutator comprises a cylindrical arc of about 120°, including the segments 20, 21, straight lines extending from the outer edges of the segments 20, 21 and tangent to the outer surface of the commutator segment 19, and a cylindrical surface portion of the segment 19 covering an arc of about 120°. The effective outline of the commutator thus includes two substantially cylindrical portions of different radii disposed on opposite sides of the rotor shaft.

For supplying current to the commutator, there is provided a pair of brushes 22, 23, which are mounted by spring supports 24, 25 anchored by means such as pins 26, 27. The spring supports 24, 25 are arranged to urge the brushes 22, 23 toward the axis of the rotor shaft 13 so that, regardless of the rotary position of the commutator, the brushes may be held in resilient contact with segments of the commutator. The brushes are adapted to be connected to a source of electrical power, and, for purposes of illustration, a battery 28 is shown to have its terminals connected to the brush supports 24, 25, which supports are formed of conductive material.

When current is supplied to the brush 22, 23, the coils 14—16 of the rotor are appropriately energized, producing a torque which tends to drive the rotor in, for example, a clockwise direction. Assuming that the initial position of the rotor is as illustrated in FIG. 1, the brushes 22, 23 are in contact with the commutator segments 20, 21, so that current flows through the coil 14, and through the coils 15, 16 in series.

As the motor rotates in, say, a clockwise direction, the brush 23 will be displaced outwardly or away from the rotor shaft 13, while the brush 22 is caused to move inwardly, by the spring support 24, so that the brushes are displaced to the right, although remaining in contact with the commutator segments 20, 21. After 30° of rotation of the rotor, from the position illustrated in FIG. 1, the brush 23 will be substantially in tangent relation to the arc circumscribing the commutator elements 20, 21 and the brush 22 is substantially in tangent relation to the commutator segment 19. At this point, the coils 14 and 16 are energized, while the coil 15 is de-energized, and the brushes 22, 23 are displaced to the right to the maximum extent provided by the eccentricity of the commutator. During the following 120° of rotation, the brushes 22, 23 remain displaced to the right, and the coil 15 is re-energized but with opposite polarity. The coil 14 is later de-energized and then re-energized with opposite polarity. As the 120° phase of rotation ends, the leading edge of the commutator segment 21 is in contact or is about to contact the brush 22, and the trailing edge of the commutator segment 20 is tending to move away from the brush 23. During the next 60° of rotation the brushes 22, 23 are moved from positions displaced fully to the right to positions displaced fully to the left, and, accordingly, during each complete revolution of the commutator, the brushes 22, 23 are displaced fully in both directions, during 60° rotational periods, and the motor rotates 120° between each displacement period.

In accordance with the invention, the oscillatory movement of the brushes 22, 23 is utilized to effect highly accurate governing of the motor speed, in accordance with the general scheme set forth in my beforementioned prior patents. Thus, the apparatus of FIG. 1 includes a constant speed device comprising a balance wheel 29 fixed to a shaft 30 and adapted to be rotated back and forth, in an oscillatory manner, by a hairspring 31. In accordance with well-known principles, a balance wheel and hairspring combination, having known characteristics, may be caused to oscillate at a fixed frequency and may be kept oscillating in such a manner for an indefinite period of time by periodically imparting to the balance wheel energy impulses sufficient to make up for the various frictional losses.

Associated with the balance wheel 29 is a pallet lever 32 pivoted between its ends by a shaft 33. At its upper end, the pallet lever 32 has a yoke 34 adapted to receive a pin 35 carried by the balance wheel. As the balance wheel oscillates, the pin 35 engages the fork and pivots the lever in one direction through a limited distance. On the return oscillation of the balance wheel, the fork 34 is again engaged and the pallet lever 32 is shifted in the opposite direction.

Advantageously, the lower end of the pallet lever 32 comprises an arm 36, which is in the form of a magnet polarized so that its right and left hand sides constitute opposite poles. The arm 36 lies between the brushes 22, 23 and is adapted, in a manner to be described, to engage the brushes alternately and hold them in displaced positions. As described in greater detail in the copending application of Arthur W. Haydon et al., suitable magnetic means 37, 38 may be placed on opposite sides of the arm 36, so that, when the pallet lever 32 is pivoted to one side or the other, the arm 36 thereof is attracted toward the adjacent magnetic means.

Considering the operation of the balance wheel mechanism apart from that of the motor, an oscillation of the balance wheel 29 in, for example, a clockwise direction will cause the pallet lever 32 to be pivoted in a counterclockwise direction, so that the arm 36 is moved toward and then attracted by the magnetic means 38. The arm 36 is thereupon drawn toward the magnetic means 38 to an extent permitted by a banking pin 39, which limits counterclockwise pivoting movement of the pallet lever 32. A return or counterclockwise oscillation of the balance wheel causes the pallet lever 32 to be shifted or pivoted in a clockwise direction, so that the arm 36 is drawn toward the magnetic means 37, to an extent limited by a second banking pin 40.

In the operation of the apparatus of FIG. 1, an energy source 28, which may be a 1.65 volt flashlight dry cell, for example, is connected to the brush supports 24, 25, causing the rotor coils 14—16 to be appropriately energized and the rotor to be set into rotation. The nature of the energy source 28 is such, in relation to the motor characteristics and to the contemplated motor load, that the motor will tend to accelerate to and operate at a speed higher than is desired.

As the rotor 11 rotates, the brushes 22, 23 are alternately displaced to the right and to the left, with respect to the rotor axis, and the upper ends of the brushes alternately come into contact with and tend to displace the arm 36 carried at the lower end of the pallet lever 32. Each time a brush strikes the pallet lever arm 36 an energy impulse is imparted to the balance wheel 29, through the pin 35, so that the balance wheel 29 is set into oscillation at its natural frequency. When the rotor 11 accelerates to a speed near a desired predetermined speed, the oscillatory displacement of the brushes 22, 23 occurs at a frequency near the natural frequency of the balance wheel 29. At this time, the balance wheel mechanism begins to govern the speed of the rotor in the manner described below.

Following a displacement of the brushes 22, 23 to the right, for example, the balance wheel 29, oscillating in a clockwise direction, will cause the pallet lever 32 to be shifted in a counterclockwise direction and held against the banking pin 39. Advantageously, the dimensions of the pallet lever 32 and arm 36 are such, in relation to the dimensions and configuration of the commutator and brushes that, when the arm 36 and brush 23 are displaced to the right to the maximum extent, the brush 23 will be spaced slightly from the arm 36. Since the rotor 11 tends to operate at a speed faster than the natural oscillatory rate of the balance wheel 29, the commutator moves around to engage the left hand brush 22 and displace it to the left before the return oscillation of the balance wheel 29 effects the release of the pallet lever 32 from its counterclockwise position. Accordingly, while the brush 23 tends to follow the commutator and remain in contact therewith, it is prevented from doing so by engagement of the upper end of the brush with the pallet lever arm 36. And, this respect, it will be understood that the attraction between the arm 36 and magnetic means 38 is sufficient to overcome the resilient force urging the brush 23 toward the commutator. Accordingly, the energy circuit through the brushes, commutator and coils is broken and the motor begins to decelerate.

At an instant determined solely by the operation of the balance wheel 29, the pallet lever 32 is engaged by the pin 35 and caused to pivot in a clockwise direction, the resilient force applied to the brush 23, together with the impulse imparted to the pallet lever by the balance wheel pin 35, being sufficient to overcome the action of the magnetic means 38. When the pallet lever 32 is released and begins to pivot in a clockwise direction, the brush 23 acts upon the arm 36 and thereby imparts to the balance wheel energy previously stored in the spring supports during displacement of the brush 23. Impulses of energy thus imparted will, of course, be of constant magnitude on all occasions.

During continued operation of the apparatus of FIG. 1, the motor circuit is periodically broken or opened at instants determined by the travel of the motor. That is, the motor circuits will be opened at instants when the rotating commutator moves out of contact with a brush held in a displaced position by the pallet lever arm 36. Following each opening of the motor circuit, at instants determined by the travel of the motor, the circuit is closed at instants determined solely by operation of the balance wheel 29. The arrangement is such that, although the instantaneous rotational speed of the rotor 11 will vary as the motor circuit is cyclically opened and closed, the average rotational speed of the rotor will be an exact function of balance wheel oscillation.

As will be readily apparent, the improved apparatus of FIG. 1 retains all the advantageous characteristics of my patented devices, in respect of governing of the motor speed, while constituting a substantial improvement over the prior devices in respect of structural simplicity and compactness and in respect of electrical characteristics. One of the most important features of the new apparatus is that governing of the motor, by cyclically opening and closing the motor circuit, is accomplished at the commutator and it does not require a separate set of contacts. In this respect, the apparatus of FIG. 1 is ideally suited for operating a battery driven clock, for example, which may be required to operate for a period as long as several years on a conventional 1.65 volt flashlight cell and which must therefore have optimum electrical characteristics. The improved arrangement also requires fewer parts and is therefore more suitable for miniaturization and for economical manufacture.

The device of FIG. 3 is a motor-governor combination, similar in its operation to the device of FIG. 1, but incorporating certain modifications. Thus, a rotor, which is not specifically shown, is mounted on a shaft 50, and the shaft 50 carries a commutator 51 which is eccentric or noncircular with respect to the axis of the rotor shaft 50. Advantageously, the commutator 51, which is comprised of a body 52 and three commutator segments 54—56, has an outline which is substantially the same as that of the commutator incorporated in the device of FIG. 1. Thus, the commutator segment 56 is a sector of a cylinder, covering an arc of about 120°. The segments 54, 55 have portions forming a sector of a cylinder, covering an arc of about 120°, of larger radius than the sector formed by the segment 56, and the segments 54, 55 also have straight portions which extend into tangent relation with the segment 56. The centers of curvature of the segment 56 and of the arcuate portions of segments 54, 55 lie on the axis of the rotor shaft 50, and the radius of the segment 56 is advantageously less than that of the arcuate portions of the segments 54, 55 by an amount to provide the desired brush displacement. A pair of brushes 57, 58, which may be of spring material or otherwise arranged to be urged resiliently toward the commutator 51, are positioned on opposite sides of the commutator and are arranged to follow the surface of the commutator during rotations thereof. The brushes 57, 58 are adapted to be connected to a suitable source of electrical energy, such as a battery 59.

Adjacent the upper end of the brushes 57, 58 is a constant speed mechanism, generally designated by the numeral 60, which comprises a balance wheel 61, with its usual hairspring (not show), which is fixed to a shaft 62. A cam 63 is mounted on the shaft 62 for oscillatory movement with balance wheel 61. The cam 63 may have a configuration similar to that of the commutator 51 and is so oriented with respect to the shaft 62 and balance wheel 61 that, in the normal or rest position of the balance wheel, the large radius portion of the cam extends in a vertical direction and the edges of the cam are out of contact with the brushes 57, 58.

When electrical energy is supplied to the brushes 57, 58, the motor is energized and the commutator 51 begins to rotate in, say, a clockwise direction. This causes the brushes 57, 58 to oscillate back and forth, substantially as described in connection with the device of FIG. 1, so that the constant speed device 60 is set in motion. Governing action is obtained in a manner substantially similar to that described in my prior Patent No. Re. 24,310. Thus, when the motor is operating near a predetermined desired speed, the motor circuit is broken once during each half revolution of the motor, as the eccentric commutator 51 moves away from a brush retained in a displaced position by the cam 63. During that same half cycle of motor operation, but at an instant determined by the operation of the constant speed device, the brush is released by the cam 63 and the motor circuit is again established. And, as described in the reissued patent, during the instants of release of a brush by the cam 63, an impulse of known magnitude is imparted to the balance wheel by the brush, as the brush moves from a position of maximum displacement to a position of minimum displacement.

While the present invention is not limited to commutators of specific shape or outline, the shape of the commutator incorporated in the devices of FIGS. 1 and 3 is particularly advantageous for motor governor combinations of the types described, since a commutator of such shape imparts a pattern of oscillatory movement to the brushes which is particularly desirable for accomplishing the desired governing action. Thus, the described commutator outline provides for sharp transition from a circular outline of one radius to a circular outline of a different radius, and this assures that, when a brush is released by the constant speed mechanism, the resilient restoring force acting on the brush will cause the brush to move dependably through a predetermined distance, equal to the distance between the radii of the respective circular outline portions of the commutator.

In the device of FIG. 4, a motor having an eccentric commutator 70 mounted on its motor shaft 71 is arranged to effect the performance of additional functions, such as counting, timing, etc. Thus, the commutator 70 is, by way of illustration, circular in form but eccentrically mounted. Thus, for the purpose of this description, the commutator 70 is considered to be non-circular with respect to the axis of the rotor shaft 71. The commutator 70, which may have an appropriate number of segments, is engaged at spaced points by brushes 72, 73 formed of resilient material or otherwise mounted or acted upon by resilient means, whereby the brushes follow the outline of the commutator during rotations thereof. Power may be supplied to the brushes 72, 73 by a battery 74 or other suitable source.

In the device of FIG. 4, the brush 73 has, at its upper end, an arm 75, which extends outward and has an end portion 76 forming a pawl adapted for cooperation with a ratchet wheel 77 mounted on a shaft 78. When energy is supplied to the brushes 72, 73, the motor is energized and the commutator 70 is rotated to cause the brushes 72, 73 to oscillate back and forth. During each complete rotation of the commutator 70, the brush 73 is caused to move through an oscillatory cycle from left to right, and each movement of the brush to the right causes the ratchet wheel 77 to be rotated through a predetermined distance. During each movement of the brush 73 to the left the pawl 76 withdraws from one tooth of the ratchet wheel and engages an adjacent tooth. In a practical device, the ratchet wheel 77, which is fixed to the shaft 78, may be arranged to drive a mechanical counter, for example, so that rotations of the rotor shaft 71 may be totalized.

A device such as illustrated in FIG. 4 may in addition, or in the alternative, be provided with contact means arranged to be closed and opened cyclically, in accordance with rotations of the eccentric commutator 70. Thus, the brush 72 carries at its upper end a contact 79 arranged to cooperate with a contact 80 carried at the end of a resilient contact mount 81. The brush 72 is connected to one side of the energy source 74, and the other side of the source may be connected, through a suitable load or circuit 82, to the contact support 81. During operation of the motor, the brush 72 is caused cyclically to be displaced to the left to an extent sufficient to cause the contacts 79, 80 to be closed. The arrangement is such, in the device of FIG. 4, that the contacts 79, 80 are closed once during each revolution of the eccentric commutator 70, and the closing of the contacts completes a circuit through the load or system 82, whereby timing, counting and other operations may be initiated or performed.

In the form of the device illustrated in FIG. 5, a motor is provided on its rotor shaft 90 with a commutator 91 in the shape of a spiral. Brushes 92, 93, formed of resilient material or otherwise mounted or acted upon by resilient means, are urged toward the surface of the commutator, at spaced points, and are arranged to be connected to a source of electrical power, such as a battery 94, whereby to complete a power circuit to the motor. The illustrated form of commutator is such that, as the commutator rotates in a counterclockwise direction, the brushes 92, 93 are progressively displaced away from the axis of the rotor shaft 90 and then suddenly permitted to return toward the shaft, as a sharp drop-off 95 in the cam outline passes the end of a brush.

In the device specifically illustrated in FIG. 5, the operation of the motor is governed by a constant speed mechanism, including a balance wheel 96, hairspring (not shown), balance wheel shaft 97 and a cam 98 fixed to the balance wheel shaft. The normal or rest position of the balance wheel is such that the cam 98 has its large radius portion directed approximately parallel to the brush 92; that is, almost directly toward or away from the rotary shaft 90. The governing action is substantially the same as that described in connection with the devices of FIGS. 1 and 3, except that the constant speed device acts only upon one of the brushes, and the making and breaking of the motor circuit occurs once, rather than twice, during each revolution of the commutator 91. If desired, of course, the brushes could be arranged so that the constant speed device acted upon both, in the usual manner.

The brush 93 of the FIG. 5 device is arranged between a pair of contacts 99, 100 mounted by resilient supports 101, 102. During rotation of the commutator 91, the brush 93 is caused to move toward and away from the rotor shaft 90, and, in its inner and outer limit positions, the brush 93 engages the contacts 99, 100 respectively. The arrangement is such that, during each rotation of the commutator 91, the contacts 99, 100 are opened and closed, and the timing of the opening and closing may be regulated, to a degree, by adjusting the normal position of the contacts 99, 100 with respect to the brush 93. The opening and closing of the contacts 99, 100 may be utilized to advantage in a variety of ways, as in counting, timing or the like.

Although the invention is not thus limited, it may be incorporated to great advantage in motor-governor combination of the type in which, during each cyclical period of operation of the motor at or near a desired predetermined speed, the motor circuit is opened at an instant determined by the travel of the motor and closed at an instant determined by the operation of a constant speed device, such as a balance wheel. Thus, with the improved arrangement of the invention, the supplying of the motor with current and the opening and closing of the motor circuit are accomplished by the motor, commutator and brushes, acting in combination with a constant speed device. The improved arrangement is made possible by the use of a commutator which is non-circular with respect to the rotor shaft and which coacts with brushes mounted or acted upon by resilient means urging the brushes to follow the outline of the commutator during the rotation thereof.

One of the specific advantageous features of the invention is the provision of an eccentric or non-circular commutator of a specific outline or configuration, which is particularly suited for incorporation in motor-governor combination. Thus, the specific commutator forms illustrated in FIGS. 2 and 3 have special advantages when incorporated in motor-governor devices or combinations, and particularly in those motor-governor combinations intended for use in battery driven clocks, for example, where the operation of the motor must be accurately governed, and the motor must operate for long periods of time (as long as five years) on a single 1.65 volt flashlight cell.

In characterizing the commutator of the invention as "eccentric" or "non-circular with respect to the motor shaft" or by equivalent terms, it is intended to exclude from the characterization such commutator configurations as will not cause substantial oscillatory displacement of brushes coacting therewith. Thus, conventional armature designs, which may have small gaps between arcuate commutator segments and which therefore are not perfectly circular in configuration, do not fall within the characterization "non-circular with respect to the rotor axis," as used herein, since such gaps are bridged by the brushes and no oscillatory displacement of the brushes is caused thereby.

It will be understood, of course, that the specific forms of the invention herein illustrated are intended to be representative only, as certain changes may be made therein without departing from the clear teachings of the disclosure. Accordingly, reference should be made to the following appended claims in determining the full scope of the invention.

I claim:

1. An electric motor combination, comprising a rotor having a coil energizable by a source of electrical power, a commutator connected to said coil and rotatable with said rotor about an axis, said commutator being of eccentric peripheral outline with respect to said axis, a plurality of brushes adapted to engage said commutator at spaced points, said brushes being adapted for connection to a source of electrical power and being connected in series during simultaneous contact with said commutator, means mounting said brushes for limited resilient oscillatory movement permitting said brushes to follow the surface of said commutator during rotations thereof, and means separate from said rotor and brushes coacting with at least one of said brushes and adapted to perform a function in cycles upon movement of said one brush caused by rotation of said commutator, said commutator constituting a cam effective to cause cyclic operation of said separate means.

2. The combination of claim 1, in which the coacting means comprises a constant speed device adapted when a brush is displaced away from said axis by said commutator to hold the brush in a displaced position independent of the rotation of said commutator, said constant speed device being cyclical in operation and being adapted at a predetermined time in a cycle to release a brush from a displaced position.

3. The combination of claim 2, in which the constant speed device includes an oscillating element, said brushes are urged resiliently toward said axis and are arranged to impart periodic impulses of energy to said oscillating element, and said commutator has surface portions engaging said brushes and including a relatively sharp drop-off portion permitting rapid movement of said brushes toward said axis during periods in which energy is imparted to said oscillating element.

4. The combination of claim 3, in which first and second outline portions of said commutator are of arcuate shape and have centers of curvature on said axis, said outline portions are on opposite sides of said axis, and one of said outline portions has a radius of curvature greater than the other.

5. The combination of claim 4, in which said first outline portion is formed by a plurality of rectilinear elements disposed in parallel relation to said axis, and said second outline portion comprises a collar disposed concentrically about said axis.

6. The combination of claim 1, in which said coacting means comprises switch contact means arranged to be actuated cyclically by rotation of said commutator, said contact means including a member engaging said commutator and adapted to be displaced thereby.

7. The combination of claim 6, in which said contact means includes one of said brushes.

8. The combination of claim 1, in which said coacting means comprises a pawl member engaging said commutator and adapted to be displaced thereby, and ratchet means operable by said pawl member.

9. The combination of claim 8, in which said pawl member is attached to one of said brushes.

10. An electric motor combination, comprising a rotor having a coil energizable by a source of electrical power, a commutator connected to said coil and rotatable with said rotor, said commutator being of eccentric peripheral outline with respect to its axis of rotation, the effective center of said commutator being offset from said axis of rotation, a pair of brushes adapted to engage said commutator for supplying electrical power to said commutator and coil, said brushes being connected in series through said commutator and said coil, and means mounting said brushes for limited oscillatory resilient movement permitting said brush to follow the surface of said commutator during rotations thereof.

11. The combination of claim 10, which includes means separate from said rotor coacting with one of said brushes and performing a function in cycles upon movement of said one brush caused by rotation of said commutator.

12. The combination of claim 11, in which said coacting means comprises a constant speed device adapted when said one brush is displaced away from said axis by said commutator to hold the brush in a displaced position independent of the rotation of said commutator.

13. An electric motor combination, comprising a rotor mounted on a rotor shaft, a stator, an electrical power source for energizing said motor, contact means comprising a brush member and a conductive member of eccentric peripheral outline with respect to said rotor shaft, one of said members being rotatable with said rotor, said contact means being connected in the power circuit for said motor whereby said motor may be energized when said contact means are closed and de-energized when said contact means are open, and cycling means separate from said conductive member and said brush member associated with said brush member, said cycling member being actuated by said brush member upon displacement thereof during relative rotation of said brush and conductive members for performing a function in cycles.

14. A commutator for an electric motor, which comprises a plurality of commutator segments, and means mounting said segments for rotation with the rotor of a motor, said mounting means supporting said segments in an effectively eccentric peripheral outline with respect to the axis of rotation of the commutator, the effective center of said commutator being offset from said axis of rotation.

15. The commutator of claim 14, in which said segments are arranged to form a first outline portion in the form of a sector of a cylinder of predetermined radius, and a second outline portion in the form of a sector of a cylinder of a radius different from said predetermined radius.

16. The commutator of claim 15, in which said first and second outline portions are arranged on opposite sides of said axis and extend over angles of about 120°.

17. The commutator of claim 15, in which the centers of curvature of the respective sectors are substantially coincident with said axis.

18. The commutator of claim 15, in which said first and second outline portions are connected by substantially straight line outline portions.

19. The commutator of claim 15, in which at least one of said outline portions comprises a substantially cylindrical sector whose axis coincides substantially with said axis of rotation.

References Cited in the file of this patent

UNITED STATES PATENTS

| | | |
|---|---|---|
| 912,037 | Seidel | Feb. 9, 1909 |
| 1,578,096 | Sandell | Mar. 23, 1926 |
| 1,857,209 | Moore | May 10, 1932 |
| 2,000,600 | Loeffler | May 7, 1935 |
| 2,523,298 | Haydon | Sept. 26, 1950 |
| 2,717,350 | Brailsford | Sept. 6, 1955 |

FOREIGN PATENTS

| | | |
|---|---|---|
| 421,924 | Great Britain | Jan. 2, 1935 |